US012032609B1

(12) United States Patent
Naganathan

(10) Patent No.: US 12,032,609 B1
(45) Date of Patent: Jul. 9, 2024

(54) SYSTEM, METHOD, AND COMPUTER PROGRAM FOR PERFORMING SEMANTIC TYPE-AHEAD SUGGESTIONS FOR NATURAL LANGUAGE DATABASE SEARCHES

(71) Applicant: Apttus Corporation, San Mateo, CA (US)

(72) Inventor: Venkatraman Naganathan, San Jose, CA (US)

(73) Assignee: Apttus Corporation, San Mateo, CA (US)

( * ) Notice: Subject to any disclaimer, the term of this patent is extended or adjusted under 35 U.S.C. 154(b) by 189 days.

(21) Appl. No.: 17/864,302

(22) Filed: Jul. 13, 2022

(51) Int. Cl.
*G06F 16/332* (2019.01)
*G06F 40/30* (2020.01)

(52) U.S. Cl.
CPC ...... *G06F 16/3325* (2019.01); *G06F 16/3329* (2019.01); *G06F 40/30* (2020.01)

(58) Field of Classification Search
CPC ... G06F 16/3325; G06F 16/3329; G06F 40/30
See application file for complete search history.

(56) References Cited

U.S. PATENT DOCUMENTS

| | | | | |
|---|---|---|---|---|
| 8,583,675 B1 * | 11/2013 | Haahr | ................. | G06F 16/3322 707/723 |
| 9,098,569 B1 * | 8/2015 | Bhagat | ................. | G06F 16/9535 |
| 10,102,199 B2 * | 10/2018 | Bailey | ................. | G06F 40/289 |
| 11,061,948 B2 * | 7/2021 | Su | ................. | G06F 40/274 |
| 11,302,314 B1 * | 4/2022 | Jawale | ................. | G06N 3/08 |
| 11,475,053 B1 * | 10/2022 | Das | ................. | G06F 16/3344 |
| 11,573,989 B2 * | 2/2023 | Bailey | ................. | G06F 16/3329 |
| 11,625,436 B2 * | 4/2023 | Kang | ................. | G06F 40/44 707/765 |
| 2011/0083079 A1 * | 4/2011 | Farrell | ................. | G06F 3/0237 715/780 |
| 2011/0246465 A1 * | 10/2011 | Koister | ................. | G06F 16/353 707/E17.014 |
| 2012/0254143 A1 * | 10/2012 | Varma | ................. | G06F 40/30 707/706 |
| 2014/0181084 A1 * | 6/2014 | Herron | ................. | G06F 16/2425 707/722 |

(Continued)

*Primary Examiner* — Robert W Beausoliel, Jr.
*Assistant Examiner* — Susan F Rayyan
(74) *Attorney, Agent, or Firm* — Lessani Law Group, PC

(57) ABSTRACT

Semantic type-ahead suggestions are provided for natural language database searches. The system maintains an index of previous natural language database searches and a sorted prefix map based on words used in previous natural language database searches. The system receives user input for a new search, creates a search list based on the user input and user input synonyms, searches the index using the search list, and creates a candidate match list with matching previous searches in the index. If the system determines that the user input includes a database object reference, it filters out searches in the candidate match list that are associated with a different database object. The system ranks the remaining searches in the candidate match list and displays the top n-ranked previous searches in the candidate match list as type-ahead suggestions. The system repeats the steps for each incremental input character and updates the type-ahead suggestions accordingly.

21 Claims, 8 Drawing Sheets

(56) References Cited

U.S. PATENT DOCUMENTS

| | | | | |
|---|---|---|---|---|
| 2015/0193447 | A1* | 7/2015 | Voinea | G06F 16/3322 |
| | | | | 707/767 |
| 2016/0179781 | A1* | 6/2016 | Boss | G06F 16/337 |
| | | | | 704/1 |
| 2016/0360336 | A1* | 12/2016 | Gross | H04W 4/025 |
| 2017/0192991 | A1* | 7/2017 | Touma | G06F 16/3322 |
| 2019/0139434 | A1* | 5/2019 | DeLuca | G09B 7/04 |
| 2019/0171728 | A1* | 6/2019 | Wakankar | G06F 16/90324 |
| 2019/0354604 | A1* | 11/2019 | Filonov | G06F 16/3325 |
| 2020/0019632 | A1* | 1/2020 | Larchev | G06F 16/242 |
| 2020/0293521 | A1* | 9/2020 | Kussmaul | G06F 16/2453 |
| 2020/0410007 | A1* | 12/2020 | Kawaguchi | G06F 16/90324 |
| 2021/0019309 | A1* | 1/2021 | Yadav | G06F 16/2428 |
| 2021/0049212 | A1* | 2/2021 | Weber | G06F 40/30 |
| 2022/0035867 | A1* | 2/2022 | Tambi | G06F 40/263 |
| 2022/0180060 | A1* | 6/2022 | Jain | G06F 40/205 |
| 2023/0205996 | A1* | 6/2023 | Atallah | G06F 40/30 |
| | | | | 704/9 |
| 2024/0004940 | A1* | 1/2024 | Tendler | G06F 16/9532 |

* cited by examiner

Example Process for Ranking Searches in the Candidate Match List

SYSTEM, METHOD, AND COMPUTER PROGRAM FOR PERFORMING SEMANTIC TYPE-AHEAD SUGGESTIONS FOR NATURAL LANGUAGE DATABASE SEARCHES

BACKGROUND OF THE INVENTION

1. Field of the Invention

This invention relates generally to natural language database searches and, more specifically, to a system and method for performing semantic type-ahead suggestions for natural language searches for documents in a database.

2. Description of the Background Art

Type-ahead functionality is a common feature in search engines. It provides useful insights or tips to the user and can help the user to uncover advanced, latent features in the system. Natural language interfaces present a challenge for type-ahead functionality. For example, a simple expression such as "agreements with ACV over $20 k" can be expressed in different ways (e.g., contracts>=$20 k, agreements over $20 k, contracts with ACV>=$20 k, agreements that have ACV of over $20 k, etc.). Given the diverse nature of inputs, a simplistic type-ahead functionality is often limited and useless.

Furthermore, most type-ahead functionality is performed with minimal processing, for example, through prefix matching or substring matching of user input and by returning the matches. The more advanced ones do word matches, but none of them include semantic matches. This is because, for type-ahead suggestions to be valuable, they have to be processed in real time (e.g., within a sub-second) as a user is entering an input and provide relevant suggestions. The more processing the backend system does, the slower will be the response and the value of the type-ahead functionality diminishes significantly.

While GOOGLE has helpful type-ahead functionality within its search engine, its type-ahead functionality requires a very high scale, that is, the input of billions of expressions in order for the system to analyze the data patterns and offer meaningful suggestions. What then does an entity do when it does not operate at a very high scale and cannot harness billions of expressions worth of data? The present invention provides a novel approach to type-ahead functionality by performing real-time semantic type-ahead. As a user inputs a search request, the system looks up an index of synonyms in real time, both for whole words and for prefixes that are mapped to whole words, and the system provides semantically-relevant type-ahead suggestions. As each word can have a multitude of synonyms and, therefore, a search request phrase can have an exponentially larger number of synonym combinations, the system also uses a ranking algorithm to sort matches in order of relevance.

SUMMARY OF THE DISCLOSURE

The present disclosure describes a system, method, and computer program for performing semantic type-ahead suggestions for natural language searches for documents in a database. The method is performed by a computer system that includes servers, storage systems, networks, operating systems, and databases.

Natural language interfaces present a real challenge for type-ahead functionality. A simple expression can be expressed in many different ways. The present invention provides a semantic type-ahead match of a user's inputs to an existing input set in substantially real time and a ranking algorithm to sort the matches in order of relevance. The system also organizes the user inputs for fast, scalable, distributed type-ahead lookups, which are used to generate the type-ahead recommendations, enforces tenant boundaries so one tenant's input cannot be seen by other tenants, and an API response that offers insights on which parts of the input are a direct match versus a synonym match on the type-ahead suggestions.

In one embodiment, a method for performing semantic type-ahead suggestions for natural language searches for documents in a database comprises the following steps:
- maintaining an index of previous natural language searches for documents in a database, wherein, for each search in the index, the index includes terms associated with the search and a database object that was the subject of the search;
- maintaining a sorted prefix map based on words used in the previous natural language searches of the database;
- receiving user input for a new search;
- creating a search list of one or more search terms based on the user input and synonyms of the user input, wherein the sorted prefix map is used to map user input prefixes to one or more whole word candidates, and wherein the whole word candidates and their synonyms are added to the search list;
- searching the index using the search list;
- creating a candidate match list with matching previous searches in the index;
- determining if the user input includes a database object reference;
- in response to determining that the user input includes a database object reference, filtering out searches in the candidate match list that are associated with a different database object;
- ranking the remaining searches in the candidate match list according to a plurality of ranking criteria;
- displaying the top n-ranked previous searches in the candidate match list as type-ahead search suggestions, wherein the search suggestions are displayed in substantially real time as the user enters input; and
- repeating the above steps for each incremental input character received and updating the type-ahead search suggestions as input is received.

BRIEF DESCRIPTION OF THE DRAWINGS

Figures IA-1B are flowcharts that illustrate a method, according to one embodiment, for performing semantic type-ahead suggestions for database searches.

DETAILED DESCRIPTION OF THE PREFERRED EMBODIMENTS

The present disclosure describes a system, method, and computer program for performing semantic type-ahead suggestions for natural language searches for documents in a database. The method is performed by a computer system that includes servers, storage systems, networks, operating systems, and databases ("the system").

Semantic type-ahead suggestions are provided for natural language database searches. The system maintains an index of previous natural language database searches and a sorted prefix map based on words used in previous natural language database searches. The system receives user input for a new search, creates a search list based on the user input and user input synonyms, searches the index using the search list, and creates a candidate match list with matching previous searches in the index. If the system determines that the user input includes a database object reference, it filters out searches in the candidate match list that are associated with a different database object. The system ranks the remaining searches in the candidate match list and displays the top n-ranked previous searches in the candidate match list as type-ahead suggestions. The system repeats the steps for each incremental input character and updates the type-ahead suggestions accordingly.

Example implementations of the methods are described in more detail with respect to FIGS. 1A-6.

1. Method for Performing Semantic Type-Ahead Suggestions for Database Searches

Figure 1A:
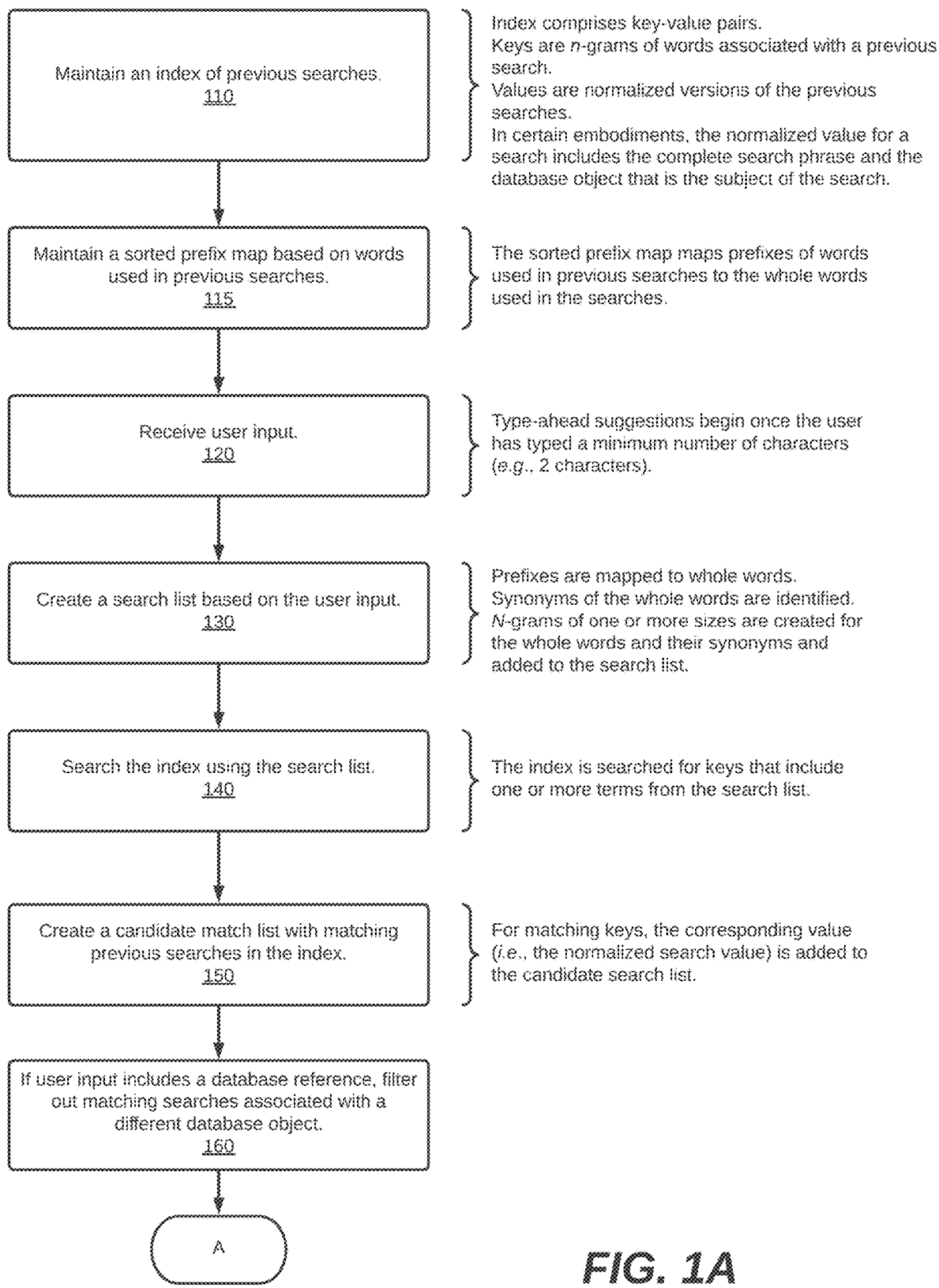
Figure 1B:
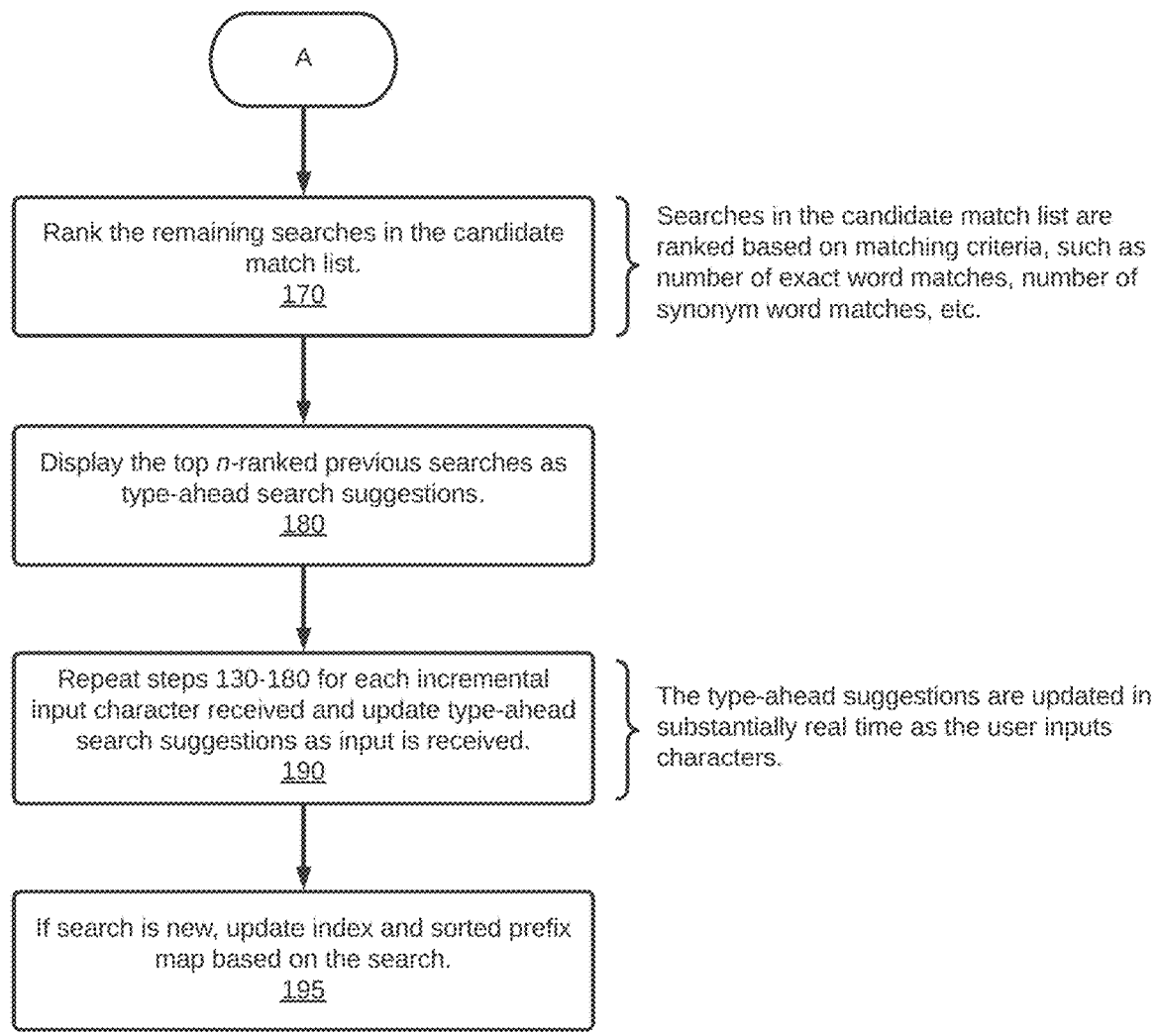

FIGS. 1A-1B illustrate a method for performing semantic type-ahead suggestions for natural language searches for documents in a database. The system maintains an index of previous natural language searches for documents in a database (step 110). For each search in the index, the index includes terms associated with the search and a database object that was the subject of the search. In certain embodiments, the index comprises a plurality of key-value pairs for each previous search stored in the index. For each previous search stored in the index, the keys are n-grams of a plurality of sizes of words associated with the search. An n-gram is a contiguous sequence of n words (where n is a positive integer). The corresponding values for the keys are a normalized version of the search. In certain embodiments, the normalized version of the search includes a complete version of the search and a database object associated with the search.

The system maintains a sorted prefix map based on words used in previous natural language searches of the database (step 115). The sorted prefix map is a list of prefixes of words sorted in dictionary order. Since the system is providing search suggestions as the user is typing (including before a user types a whole word), the sorted prefix map is used to map prefixes to one or more whole words. As used herein, a prefix is the first x letters in a word before the word is complete, where x is a positive integer. For example, for the word "contracts," the sorted prefix map includes:

C
Co
Con
Cont
Contr
Contra
Contrac
Contract
Contracts*

In certain embodiments, the whole word to which the prefixes are mapped is marked with an indicator, such as a "*," so the system knows that the marked word is the whole word to which the preceding prefixes correspond. Note, different words may have the same prefixes. For example, if prefixes for both "contacts" and "contracts" were in the sorted prefix map, and the user types "co," the system would map this to both "contacts" and "contracts" and add both words and their synonyms to the search list. In one embodiment, the words and associated prefixes in the sorted prefix map are the words used in previous searches received by the system, and the sorted prefix map and the index are updated after each search so that the sorted prefix map maps prefixes of words used in previous searches to whole words used in the searches.

The system receives user input for a new search (step 120). In certain embodiments, type-ahead search suggestions are identified and displayed in response to a user inputting a minimum number of characters (e.g., two characters). In certain embodiments, in displaying the type-ahead search suggestions, formatting is used to visually indicate the words in the suggestions that are exact or synonym matches to the user input. The system creates a search list of one or more search terms based on the user input and synonyms of the user input (step 130). The sorted prefix map is used to map user input prefixes to one or more whole word candidates. The whole word candidates and their synonyms are added to the search list. Prefixes are mapped to whole words. Synonyms of the whole words are identified. N-grams of one or more sizes are created for the whole words and their synonyms and added to the search list.

The system searches the index using the search list (step 140). The index is searched for keys that include one or more terms from the search list. The system creates a candidate match list with matching previous searches in the index (step 150). For matching keys, the corresponding value (i.e., the normalized search value) is added to the candidate search list. If the user input includes a database object reference, the system filters out searches in the candidate match list that are associated with a different database object (step 160). The present invention may also be used for type-ahead search suggestions for non-database searches. In such embodiments, step 160 would not be performed and the normalized search values in the indexes would not include a subject database object.

The system ranks the remaining searches in the candidate match list according to a plurality of ranking criteria (step 170). Searches in the candidate match list are ranked based on matching criteria, such as number of exact word matches, number of synonym word matches, etc. The system displays the top n-ranked previous searches in the candidate match list as type-ahead search suggestions (step 180). The search suggestions are displayed in substantially real time as the user enters input. The system repeats steps 130-180 for each incremental input character received and updates the type-ahead search suggestions as input is received (step 190). The type-ahead suggestions are updated in substantially real time as the user inputs characters.

If a search is new, the system updates the index and sorted prefix map based on the search (step 195). For example, in response to receiving a user's final search input and the user's final search input being a new search, the system updates the index with the new search and updates the sorted prefix map with any new words and associated prefixes in the user's final search input that are not in the sorted prefix map. In certain embodiments, updating the index with a search comprises identifying the database object that is the subject of the search. The system creates a normalized value for the search comprising a mapping of the database object to the complete search. The system splits the search into individual whole words. The system creates n-grams of a plurality of sizes of the words. The system adds the n-grams and the corresponding normalized value to the index as key-value pairs. For each word in the index, the system ensures that there are prefixes for the words in the sorted prefix map.

In certain embodiments, the computer system performs the method in a multi-tenant cloud-based application, where a separate index and sorted prefix map are maintained for each tenant and search suggestions provided to a user are based only on previous searches for the tenant associated with the user. In certain embodiments, the system limits each tenant to a fixed number of type-ahead inputs (e.g., 1000). The system uses a circular buffer to retain the recently inputted phrases (e.g., last 1000) at any point in time. Periodically (e.g., once a day at midnight), the system will recompute the index for each tenant based on the entries in the circular buffer.

2. Method for Creating a Search List

Figure 2A:
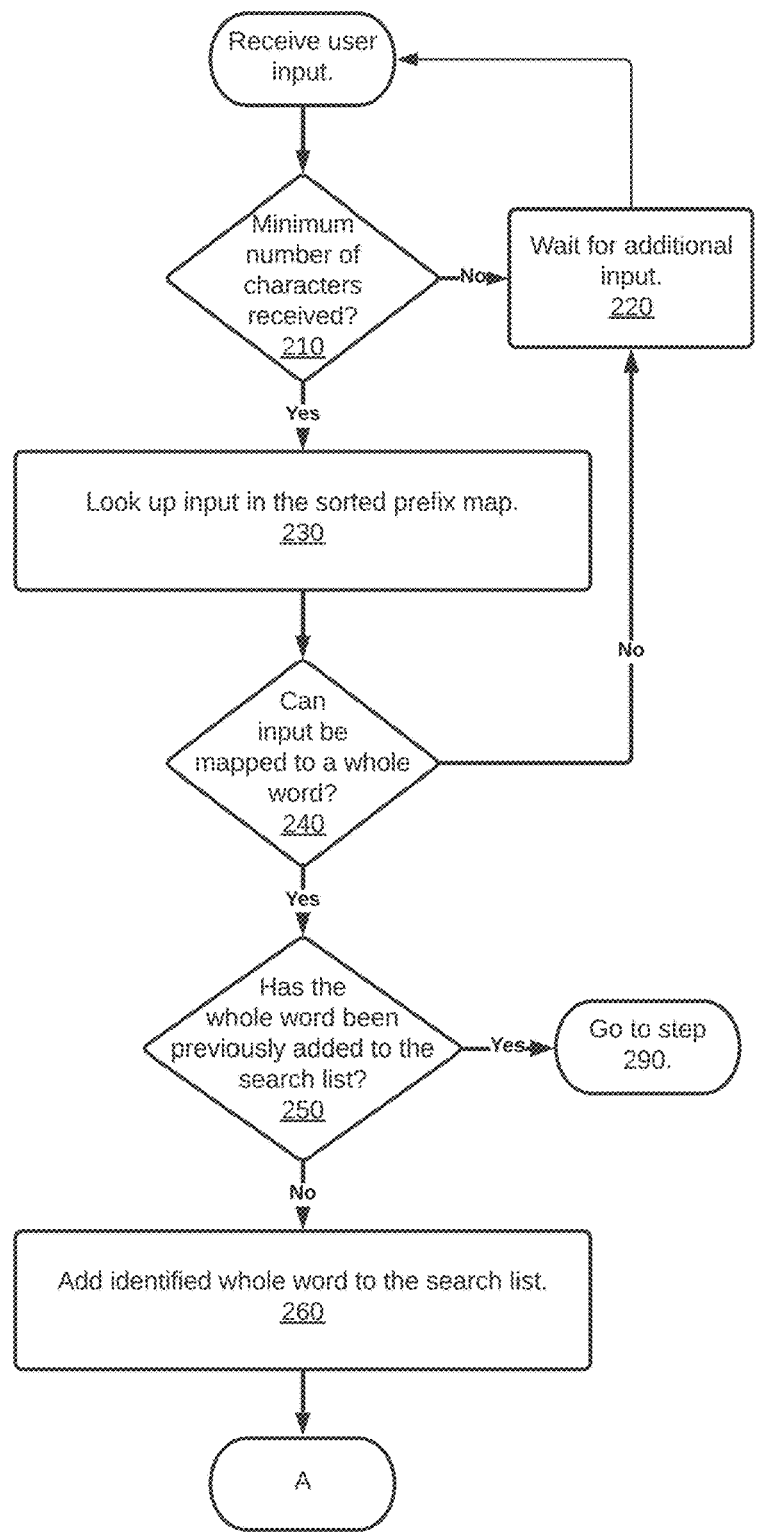
FIGS. 2A-2B are flowcharts that illustrate a method, according to one embodiment, for creating a search list.
Figure 2B:
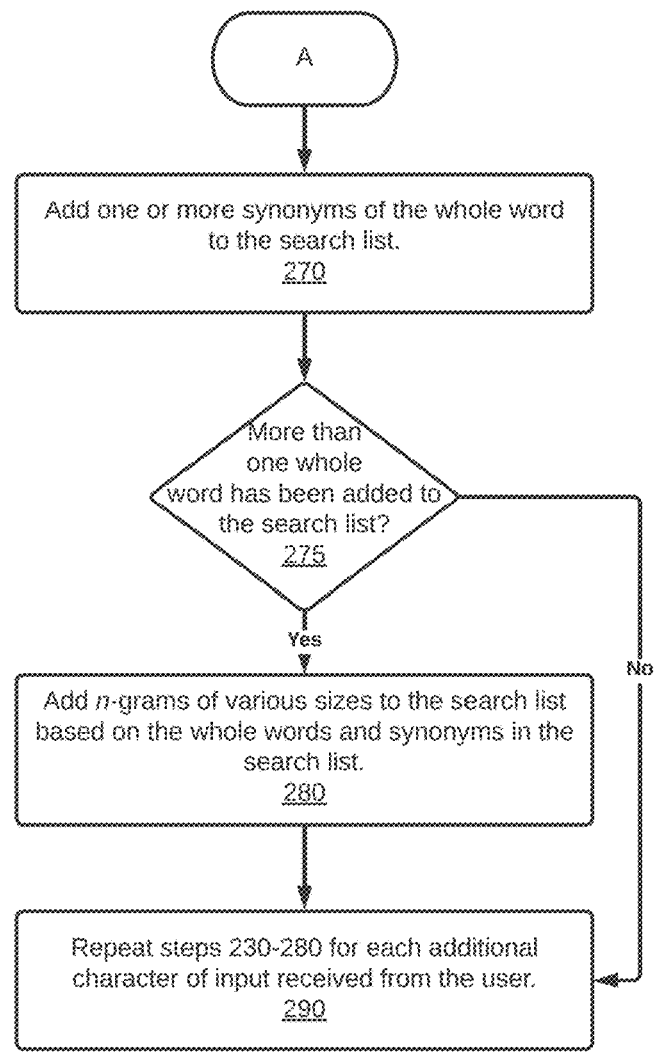

FIGS. 2A-2B illustrate a method for creating a search list. The system receives user input. The system determines whether a minimum number of characters have been received (step 210). If not, the system waits for additional input (step 220). If a minimum number of characters have been received, the system looks up the user input in the sorted prefix map (step 230). The system then determines whether the user input can be mapped to a whole word in the sorted prefix map (step 240). If the input can be mapped to a whole word, the system determines whether the whole word has been previously added to the search list (step 250). If the whole word has been previously added to the search list, the system skips ahead to step 290. Otherwise, the system adds the identified whole word to the search list (step 260). The system then adds one or more synonyms of the whole word to the search list (step 270). The system determines whether more than one whole word has been added to the search list (step 275). If more than one whole word has been added to the search list, the system adds n-grams of various sizes to the search list based on the whole words and synonyms in the search list (step 280). The system repeats steps 230-280 for each additional character of user input received from the user (step 290). If the system determines that more than one whole word has not been added to the search list, the system also skips ahead to step 290. In certain embodiments, searching the index comprises searching the keys in the index for n-grams in the search list.

3. Method for Updating Index and Sorted Prefix Map with a New Search

Figure 3:
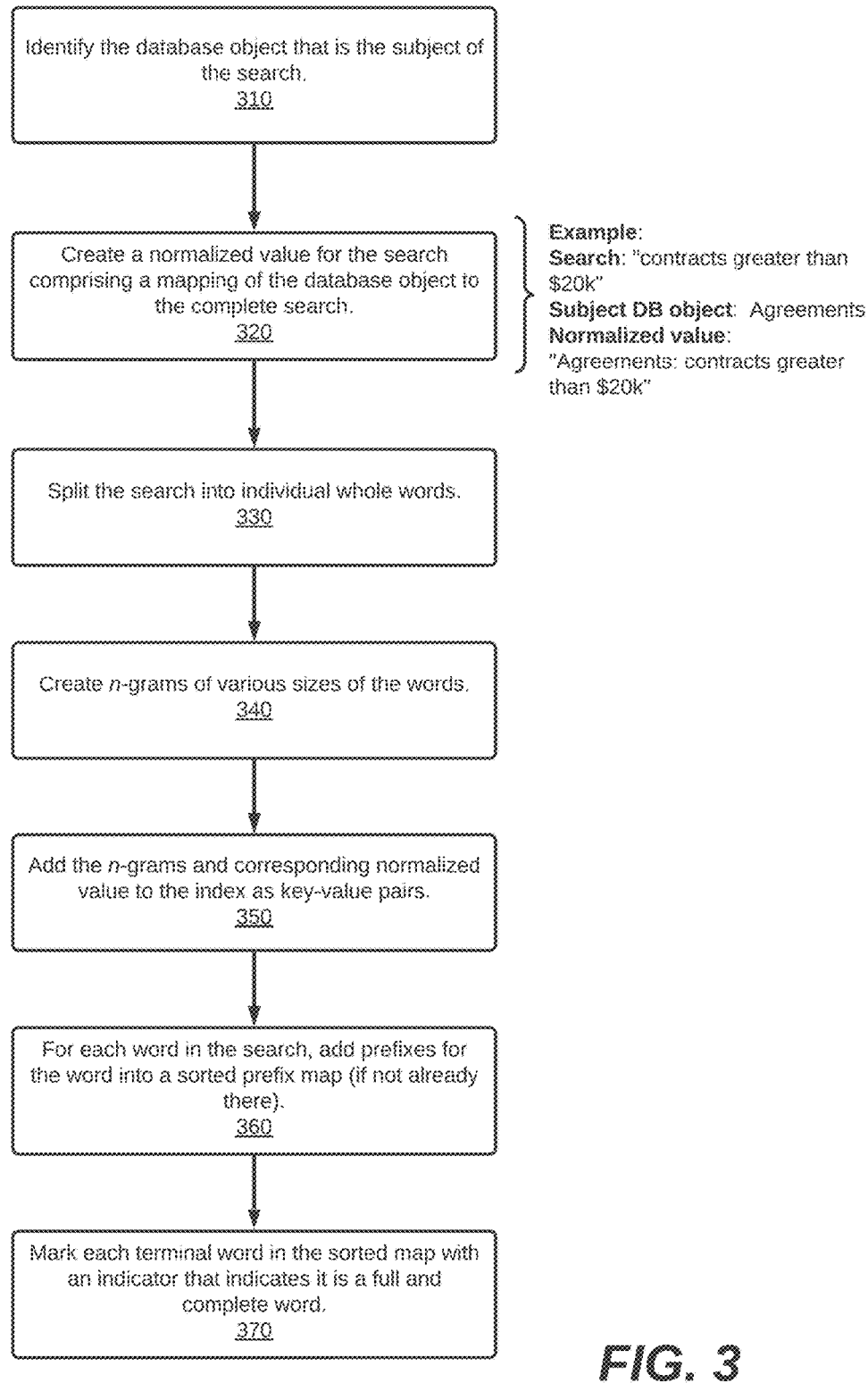
FIG. 3 is a flowchart that illustrates a method, according to one embodiment, for updating index and sorted prefix map with a new search.

FIG. 3 illustrates a method for updating an index and sorted prefix map with a new search. The system identifies the database object that is the subject of the search (step 310). The system creates a normalized value for the search comprising a mapping of the database object to the complete search (step 320). For example, in a search for "contracts greater than $20 k," the subject database object is "Agreements" and the normalized value is "Agreements: contracts greater than $20 k." The system splits the search into individual whole words (step 330). The system creates n-grams of various sizes of the words (step 340). The system adds the n-grams and corresponding normalized value to the index as key-value pairs (step 350). For each word in the search, the system adds prefixes for the word into a sorted prefix map (if not already there) (step 360). The system marks each terminal word in the sorted map with an indicator that indicates it is a full and complete word (step 370).

4. Method for Ranking Searches in the Candidate Match List

Figure 4:
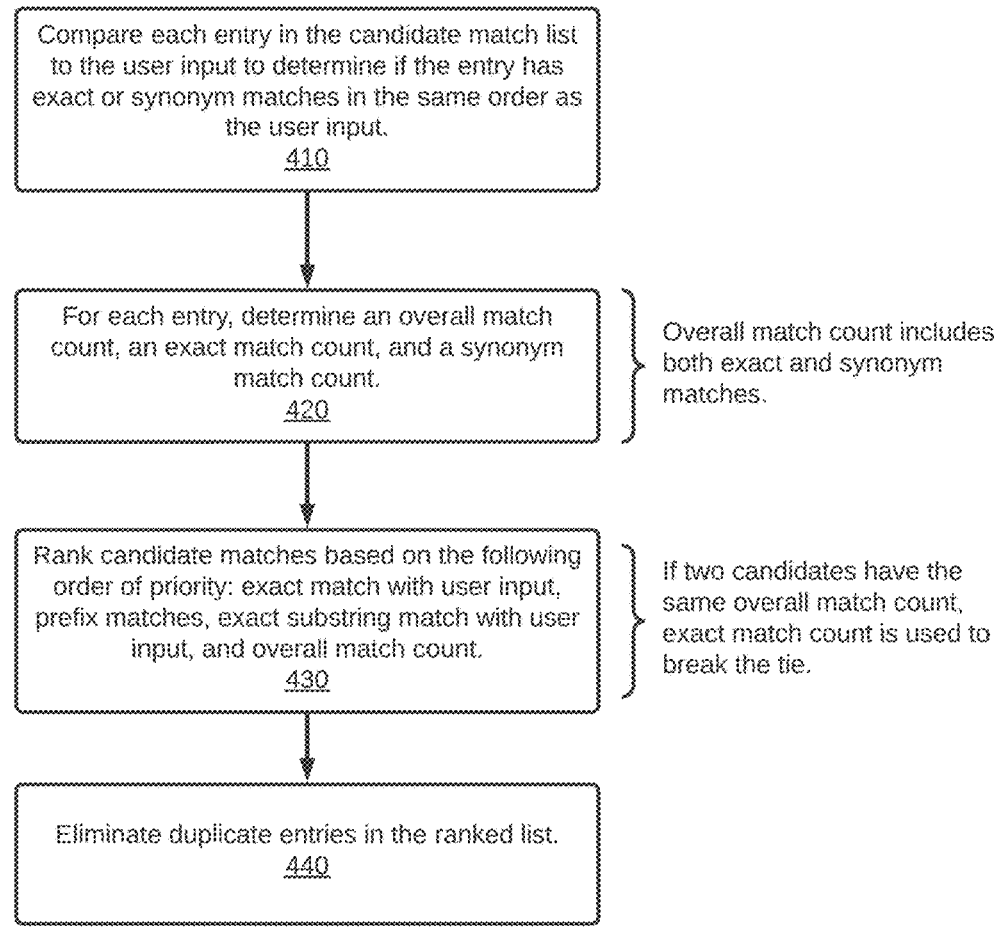
FIG. 4 is a flowchart that illustrates a method, according to one embodiment, for ranking searches in the candidate match list.

FIG. 4 illustrates a method for ranking searches in the candidate match list. The system compares each entry in the candidate match list to the user input to determine if the entry has exact or synonym matches in the same order as the user input (step 410). For each entry, the system determines an overall match count (that includes both exact matches and synonym matches), an exact match count, and a synonym match count (step 420). The system ranks candidate matches based on the following order of priority: exact match with the user input, prefix matches, exact substring match with the user input, and overall match count (step 430). If two searches in the candidate match list have the same overall match count, the exact match count is used to break the tie. The system eliminates duplicate entries in the ranked list (step 440).

5. Example Implementation

As an example of the methods described above, let us assume a user used the search phrase: "contracts greater than $20 k" to search for contracts. The system identifies the database object that is the subject of the search. In this example, for the input "contracts greater than $20 k," the subject is "agreement." The system then normalizes the input value to: "agreement: contracts greater than $20 k."

The system splits the given raw input into individual words and adds them to an index for fast lookup. In the above example, the words=["contracts," "greater," "than," "$20 k"]. They will each be added to the index as a key and value, representing the normalized input value.

For example, the key and value would be added to the index as follows:

contracts→"agreement: contracts greater than $20 k"
greater→"agreement: contracts greater than $20 k"
than→"agreement: contracts greater than $20 k"
$20 k→"agreement: contracts greater than $20 k"

Also, n-grams with sizes up to a configured number (e.g., 2, 3, 4, etc.) would be added to the index. Related to the above example:

n-grams of size 1 are: ["contracts," "greater," "than," "$20 k"]
n-grams of size 2 are: ["contracts greater," "greater than," "than $20 k"]
n-grams of size 3 are: ["contracts greater than," "greater than $20 k"]

The system puts all the n-grams (of a given size) and their synonyms into the search list. For example, for an n-gram of size 2=["contracts greater," "greater than," "than $20 k"]:

contracts greater→"agreement: contracts greater than $20 k"
greater than→"agreement: contracts greater than $20 k"
than $20 k→"agreement: contracts greater than $20 k"

For n-grams (of a given size) and their synonyms (except the trailing word in an n-gram of size 1, e.g., $20 k), the system appends an "*" before putting them into the search list to ensure that the system can perform an exact match of all the leading words and a prefix match of the last word. So, the search list for n-grams of up to size 2 will have: ["contracts*," "greater*," "than*," "$20 k,"<synonyms of contracts>*, <synonyms of greater>*, <synonyms of than>*, <synonyms of $20 k>, "contracts greater*," "greater than*," "than $20 k,"<synonyms of 'contracts greater'>*, <synonyms of 'greater than'>*, <synonyms of 'than $20 k'>*].

For each word, all prefixes are added into a sorted prefix map and the terminal word (i.e., the complete word) is marked with a trailing "*" to indicate that the prefix list for the word is complete. For example: ["c," "co," "con," "cont," "contr," "contra," "contrac," "contract," "contracts*"], ["g," "gr," "gre," "grea," "great," "greate," "greater*"], ["t," "th," "tha," "than*"], and ["$," "$2," "$20," "$20 k*"]. As the user enters new input, the system stores them in the index and sorted prefix map as discussed above.

The system first looks up all the words in the sorted prefix map. If an exact match is found and it is a complete word, the system takes it as the lone match and adds it to the search list. Otherwise, the system matches the word or the next N words below it in sorted ranked order or until a complete word is found, whichever comes first. The system adds all of these to the search list. For instance, for the prefix "co" the matches may be ["co," "con," "cont," "contr," "contra," "contrac," "contract"].

The system then looks up all full sentence matches in the index for each of the words in the search list and gathers all of the matches in a single list called the candidate match list. The candidate match list will be preprocessed as follows:

If the user input contains an object reference, the system filters out all items in the candidate match list that do not have the object in the prefix.

To do this, the system takes the user input and normalizes the object reference (e.g., contract, contracts, and agreements will all be normalized to "agreement"). The system also takes the individual matches in the candidate match list and performs the same normalization of the object prefix to see if this matches the one in the user input.

The system lists all words in the user input and their synonyms.

For each word and its synonyms, the system finds a match for each word in the candidate match list, notes the match, and slides the pointer for the next match forward. Once a match has been found for a synonym, the system moves to the next user input word match with the intent of finding a match for words in the same order that they appear in the user input. For example, for the input, "contracts greater than $20 k," the sentence, "pull up agreements from last year over $20 k," is a good match since agreements over $20 k sequentially matches the input in the same order. On the other hand, the sentence, "$20 k agreement over the last year," is not a good match as the words do not appear in the same order.

At the end of the preprocessing step, the system notes the following for each match: matching candidate, overall match count, exact match count, and synonym match count. The system then sorts the matches as follows (from highest to lowest): exact match with user input, prefix match, exact sub string match (if it appears anywhere in the sentence), and overall match count. If the overall match count is the same, then whichever candidate has a higher exact match count would prevail over a synonym match count. The system then eliminates any duplicates and picks the top n-ranked matches and returns the results.

6. Example System Architecture

Figure 5:
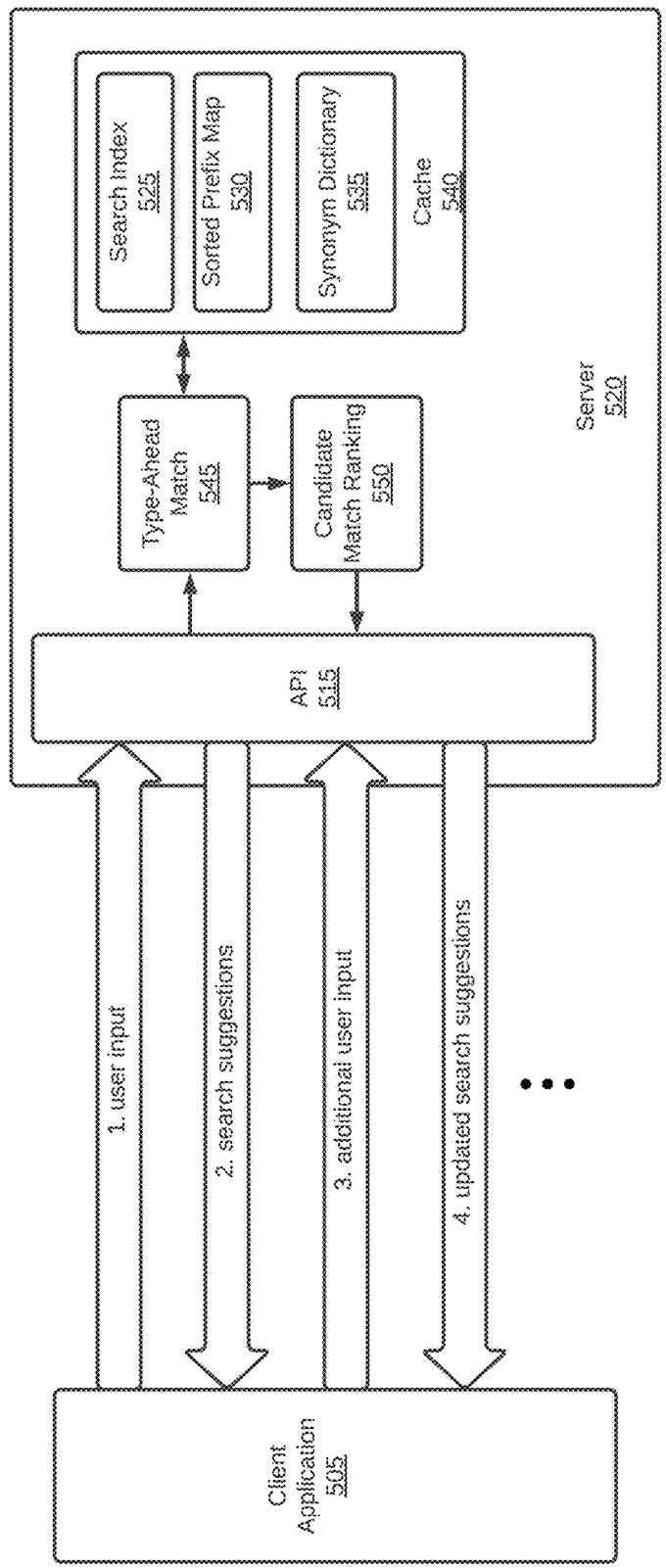
FIG. 5 is a block diagram that illustrates an example system architecture according to one embodiment.
Figure 6:
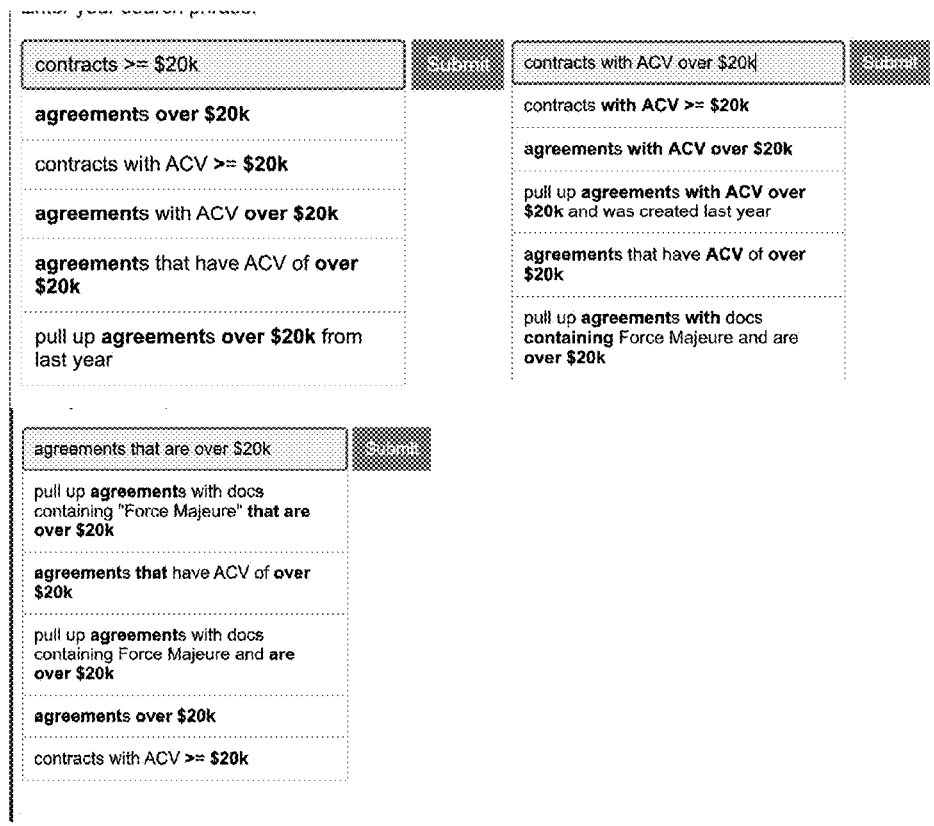
FIG. 6 is a screenshot of an exemplary user interface, according to one embodiment, that provides type-ahead suggestions for a natural language database search.

FIG. 5 illustrates an example architecture for a system that performs the methods described herein. However, the methods described herein may be implemented in other systems and are not limited to the illustrated system. As shown in FIG. 5, the client application 505 sends user input to the API 515 of the server 520. The server maintains a search index (i.e., index of previous searches) 525, a sorted prefix map (based on words used in previous searches) 530, a synonym dictionary 535, and a cache 540. As soon as a minimum number of characters have been received, the type-ahead match module 545 begins generating type-ahead suggestions. The system creates a search list based on the user input, including synonyms from the synonym dictionary 535. A synonym dictionary maps words to their synonyms. For example, a synonym dictionary uses the normalized form of the word as a key and all synonyms as values (e.g., "agreement" (key)→["agreements," "contracts," "agmt," "NDA," "MSA," "SOW," etc.]. The system searches the index using the search list. The system also creates a candidate match list and ranks the searches in the candidate match list using the candidate match ranking module 550. The candidate match ranking module 550 sends the top n-ranked searches as type-ahead search suggestions to the client application 505 via the API 515. The system then repeats the steps based on additional user input and receives updated search suggestions at the client application 505.

In one embodiment, the API 515 provides the client application 505 with information as to which words in the suggestions are exact and synonym matches.

The following is an example of an API response for "contracts greater than $20 k":

```
[
    {
        "objectId": "agreement",
        "text": "contracts >= $20k",
        "phrase": "contracts greater than $20k",
        "exactMatchingCount": 2,
        "matchingWordCount": 3,
        "synonym WordCount": 1,
        "exactMatches": [
            {
                "phrase": "contracts"
            },
            {
                "phrase": "$20k"
            }
        ],
        "synonymMatches": [
            {
                "phrase": "greater than",
                "synonym": ">="
            }
        ]
    },
    ....
]
```

The client application 505 uses this information to provide visual indications of the matches. For example, the client application 505 may bold the exact and synonym matches in the search suggestions. See, e.g., the exemplary screenshots in FIG. 6 of type-ahead suggestions to a natural language database search.

7. General

The methods described with respect to FIGS. 1A-6 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof.

Accordingly, the above disclosure is intended to be illustrative, but not limiting, of the scope of the invention, which is set forth in the following claims.

The invention claimed is:

1. A method, performed by a computer system, for performing semantic type-ahead suggestions for natural language searches for documents in a database, the method comprising:
   maintaining an index of previous natural language searches for documents in a database, wherein, for each search in the index, the index includes terms associated with the search and a database object that was the subject of the search;
   maintaining a sorted prefix map based on words used in the previous natural language searches of the database;
   receiving user input for a new search;
   creating a search list of one or more search terms based on the user input and synonyms of the user input, wherein the sorted prefix map is used to map user input prefixes to one or more whole word candidates, and wherein the whole word candidates and their synonyms are added to the search list;
   searching the index using the search list;
   creating a candidate match list with matching previous searches in the index;
   determining if the user input includes a database object reference;
   in response to determining that the user input includes a database object reference, filtering out searches in the candidate match list that are associated with a different database object;
   ranking the remaining searches in the candidate match list according to a plurality of ranking criteria;
   displaying the top n-ranked previous searches in the candidate match list as type-ahead search suggestions, wherein the search suggestions are displayed in substantially real time as the user enters input; and
   repeating the above steps for each incremental input character received and updating the type-ahead search suggestions as input is received.

2. The method of claim 1, wherein:
   the index comprises a plurality of key-value pairs for each previous search stored in the index; and
   for each previous search stored in the index, the keys are n-grams of a plurality of sizes of words associated with the search, and the corresponding values for the keys are a normalized version of the search that includes a complete version of the search and a database object associated with the search.

3. The method of claim 2, wherein creating the search list comprises:
   (a) looking up the user input in the sorted prefix map;
   (b) mapping the user input to a whole word in the sorted prefix map;
   (c) adding the whole word to the search list;
   (d) adding one or more synonyms of the whole word to the search list;
   (e) receiving additional user input;
   (f) repeating steps (b)-(e) for the additional user input; and
   (g) adding n-grams of various sizes to the search list based on the whole words and synonyms in the search list.

4. The method of claim 3, wherein searching the index comprises searching the keys in the index for the n-grams in the search list.

5. The method of claim 1, further comprising:
   receiving a user's final search input; and
   in response to the user's final search input being a new search, performing the following:
     updating the index with the new search; and
     updating the sorted prefix map with any new words and associated prefixes in the user's final search input that are not in the sorted prefix map.

6. The method of claim 2, wherein updating the index with a search comprises:
   identifying the database object that is the subject of the search;
   creating a normalized value for the search comprising a mapping of the database object to the complete search;
   splitting the search into individual whole words;
   creating n-grams of a plurality of sizes of the words;
   adding the n-grams and the corresponding normalized value to the index as key-value pairs; and
   for each word in the index, ensuring that there are prefixes for the words in a sorted prefix map.

7. The method of claim 1, wherein ranking searches in the candidate match list comprises:
   comparing each entry in the candidate match list to the user input to determine if the entry has exact or synonym matches in the same order as the user input;
   for each entry, determining an overall match count that includes both exact matches and synonym matches, an exact match count, and a synonym match count;
   ranking candidate matches based on the following order of priority: exact match with the user input, prefix matches, exact sub string match with the user input, and overall match count, wherein if two searches in the candidate search list have the same overall match count, exact match count is used to break the tie; and
   eliminating duplicate entries in the ranked list.

8. The method of claim 1, wherein the type-ahead search suggestions are identified and displayed in response to a user inputting a minimum number of characters.

9. The method of claim 1, wherein the computer system performing the method provides a multi-tenant cloud-based application, wherein a separate index is maintained for each tenant, and wherein search suggestions provided to a user are based only on previous searches for the tenant associated with the user.

10. The method of claim 1, wherein, in displaying the type-ahead search suggestions, formatting is used to visually indicate the words in the suggestions that are exact or synonym matches to the user input.

11. A non-transitory computer-readable medium comprising a computer program, that, when executed by a computer system, enables the computer system to perform the following steps for performing semantic type-ahead suggestions for natural language searches for documents in a database, the steps comprising:
   maintaining an index of previous natural language searches for documents in a database, wherein, for each search in the index, the index includes terms associated with the search and a database object that was the subject of the search;
   maintaining a sorted prefix map based on words used in the previous natural language searches of the database;
   receiving user input for a new search;
   creating a search list of one or more search terms based on the user input and synonyms of the user input, wherein the sorted prefix map is used to map user input prefixes to one or more whole word candidates, and wherein the whole word candidates and their synonyms are added to the search list;

searching the index using the search list;

creating a candidate match list with matching previous searches in the index;

determining if the user input includes a database object reference;

in response to determining that the user input includes a database object reference, filtering out searches in the candidate match list that are associated with a different database object;

ranking the remaining searches in the candidate match list according to a plurality of ranking criteria;

displaying the top n-ranked previous searches in the candidate match list as type-ahead search suggestions, wherein the search suggestions are displayed in substantially real time as the user enters input; and repeating the above steps for each incremental input character received and updating the type-ahead search suggestions as input is received.

12. The non-transitory computer-readable medium of claim 11, wherein:

the index comprises a plurality of key-value pairs for each previous search stored in the index; and for each previous search stored in the index, the keys are n-grams of a plurality of sizes of words associated with the search, and the corresponding values for the keys are a normalized version of the search that includes a complete version of the search and a database object associated with the search.

13. The non-transitory computer-readable medium of claim 12, wherein creating the search list comprises:

(a) looking up the user input in the sorted prefix map;
(b) mapping the user input to a whole word in the sorted prefix map;
(c) adding the whole word to the search list;
(d) adding one or more synonyms of the whole word to the search list;
(e) receiving additional user input;
(f) repeating steps (b)-(e) for the additional user input; and
(g) adding n-grams of various sizes to the search list based on the whole words and synonyms in the search list.

14. The non-transitory computer-readable medium of claim 13, wherein searching the index comprises searching the keys in the index for the n-grams in the search list.

15. The non-transitory computer-readable medium of claim 11, further comprising:

receiving a user's final search input; and
in response to the user's final search input being a new search, performing the following:
updating the index with the new search; and
updating the sorted prefix map with any new words and associated prefixes in the user's final search input that are not in the sorted prefix map.

16. The non-transitory computer-readable medium of claim 12, wherein updating the index with a search comprises:

identifying the database object that is the subject of the search;
creating a normalized value for the search comprising a mapping of the database object to the complete search;
splitting the search into individual whole words;
creating n-grams of a plurality of sizes of the words;
adding the n-grams and the corresponding normalized value to the index as key-value pairs; and for each word in the index, ensuring that there are prefixes for the words in a sorted prefix map.

17. The non-transitory computer-readable medium of claim 11, wherein ranking searches in the candidate match list comprises:

comparing each entry in the candidate match list to the user input to determine if the entry has exact or synonym matches in the same order as the user input;
for each entry, determining an overall match count that includes both exact matches and synonym matches, an exact match count, and a synonym match count;
ranking candidate matches based on the following order of priority: exact match with the user input, prefix matches, exact sub string match with the user input, and overall match count, wherein if two searches in the candidate search list have the same overall match count, exact match count is used to break the tie; and
eliminating duplicate entries in the ranked list.

18. The non-transitory computer-readable medium of claim 11, wherein the type-ahead search suggestions are identified and displayed in response to a user inputting a minimum number of characters.

19. The non-transitory computer-readable medium of claim 11, wherein the computer system performing the method provides a multi-tenant cloud-based application, wherein a separate index is maintained for each tenant, and wherein search suggestions provided to a user are based only on previous searches for the tenant associated with the user.

20. The non-transitory computer-readable medium of claim 11, wherein, in displaying the type-ahead search suggestions, formatting is used to visually indicate the words in the suggestions that are exact or synonym matches to the user input.

21. A computer system for performing semantic type-ahead suggestions for natural language searches for documents in a database, the system comprising:

one or more processors;
one or more memory units coupled to the one or more processors, wherein the one or more memory units store instructions that, when executed by the one or more processors, cause the system to perform the operations of:
maintaining an index of previous natural language searches for documents in a database, wherein, for each search in the index, the index includes terms associated with the search and a database object that was the subject of the search;
maintaining a sorted prefix map based on words used in the previous natural language searches of the database;
receiving user input for a new search;
creating a search list of one or more search terms based on the user input and synonyms of the user input, wherein the sorted prefix map is used to map user input prefixes to one or more whole word candidates, and wherein the whole word candidates and their synonyms are added to the search list;
searching the index using the search list;
creating a candidate match list with matching previous searches in the index;
determining if the user input includes a database object reference;
in response to determining that the user input includes a database object reference, filtering out searches in the candidate match list that are associated with a different database object;

ranking the remaining searches in the candidate match list according to a plurality of ranking criteria;

displaying the top n-ranked previous searches in the candidate match list as type-ahead search suggestions, wherein the search suggestions are displayed in substantially real time as the user enters input; and repeating the above steps for each incremental input character received and updating the type-ahead search suggestions as input is received.

* * * * *